(12) United States Patent
Chen et al.

(10) Patent No.: US 11,830,224 B2
(45) Date of Patent: Nov. 28, 2023

(54) PAGE DISPLAYING METHOD AND APPARATUS, ELECTRONIC DEVICE AND STORAGE MEDIUM

(71) Applicant: Beijing Baidu Netcom Science Technology Co., Ltd., Beijing (CN)

(72) Inventors: Zhen Chen, Beijing (CN); Zengyao Pang, Beijing (CN); Ge Song, Beijing (CN); Yinghao Du, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 255 days.

(21) Appl. No.: 17/367,016

(22) Filed: Jul. 2, 2021

(65) Prior Publication Data

US 2021/0333950 A1    Oct. 28, 2021

Related U.S. Application Data

(63) Continuation of application No. PCT/CN2020/133121, filed on Dec. 1, 2020.

(30) Foreign Application Priority Data

Apr. 8, 2020    (CN) .......................... 202010269348.6

(51) Int. Cl.
*G06T 7/90* (2017.01)
*G06T 11/40* (2006.01)
(Continued)

(52) U.S. Cl.
CPC ............... *G06T 7/90* (2017.01); *G06T 11/40* (2013.01); *G06T 11/60* (2013.01)

(58) Field of Classification Search
CPC ......... G06T 7/90; G06T 11/001; G06T 11/40; G06T 11/60; G06T 3/4007;
(Continued)

(56) References Cited

U.S. PATENT DOCUMENTS

| | | | |
|---|---|---|---|
| 5,905,493 A | 5/1999 | Belzer et al. | |
| 2007/0192164 A1* | 8/2007 | Nong | G06Q 30/02 725/35 |

(Continued)

FOREIGN PATENT DOCUMENTS

| CN | 1635467 A | 7/2005 |
|---|---|---|
| CN | 101527777 A | 9/2009 |

(Continued)

OTHER PUBLICATIONS

Supplemental European Search Report of corresponding European Application No. 20894910.7, dated Dec. 22, 2022, 16 pages.

(Continued)

*Primary Examiner* — Wesner Sajous
(74) *Attorney, Agent, or Firm* — Tucker Ellis LLP

(57) ABSTRACT

This application discloses a page displaying method and apparatus, an electronic device and a storage medium, relating to the technical field of computer vision, including: extracting a theme color from an image of a page to be displayed, and determining a coloration attribute of the theme color, where the coloration attribute is a chromatic attribute, or the coloration attribute is a non-chromatic attribute; and adjusting the page to be displayed according to the coloration attribute and displaying the page. Various pages are adjusted and displayed based on different coloration attributes of the theme color, thus avoiding a disadvantage related to lack of flexibility caused by filtering the theme color by a preset filtering range in related art, realizing diversity and flexibility in displaying for various pages, avoiding the disadvantage of distortion of images caused by simple filtering, and improving the reliability and accuracy of page display.

7 Claims, 6 Drawing Sheets

(51) Int. Cl.
  *G06T 11/60*  (2006.01)
  *H04N 1/60*   (2006.01)
  *H04N 5/202*  (2023.01)
  *H04N 5/57*   (2006.01)
  *H04N 9/69*   (2023.01)
  *H04N 9/73*   (2023.01)
  *H04N 9/77*   (2006.01)
  *G09G 5/06*   (2006.01)

(58) Field of Classification Search
  CPC .. G06T 2207/10024; G09G 5/00; G09G 5/02; G09G 5/06; G09G 5/04; G09G 5/10; G09G 5/30; G09G 2320/00; G09G 2320/02; G09G 2320/0233; G09G 2320/0242; G09G 2320/04; G09G 2320/062; G09G 2320/0626; G09G 2320/0666; G09G 2340/06; H04N 1/60; H04N 1/6027; H04N 1/6041; H04N 1/6077; H04N 5/202; H04N 5/57; H04N 9/64; H04N 9/67; H04N 9/68–69; H04N 9/77
  USPC ........................................................ 345/589
  See application file for complete search history.

(56) References Cited

U.S. PATENT DOCUMENTS

| | | | |
|---|---|---|---|
| 2010/0245221 A1* | 9/2010 | Khan | G02F 1/13476 345/87 |
| 2011/0122450 A1* | 5/2011 | Puckett | H04N 1/4052 358/3.06 |
| 2014/0181712 A1 | 6/2014 | Lucero et al. | |
| 2015/0186491 A1 | 7/2015 | Zukerman et al. | |
| 2021/0209815 A1* | 7/2021 | Ekstrand | G06T 11/60 |
| 2021/0333950 A1* | 10/2021 | Chen | G09G 5/02 |

FOREIGN PATENT DOCUMENTS

| | | |
|---|---|---|
| CN | 102622163 A | 8/2012 |
| CN | 104657465 A | 5/2015 |
| CN | 106856542 A | 6/2017 |
| CN | 108206917 A | 6/2018 |
| CN | 109783182 A | 5/2019 |
| CN | 109859283 A | 6/2019 |
| CN | 110609722 A | 12/2019 |
| CN | 110673904 A | 1/2020 |
| CN | 110865856 A | 3/2020 |
| CN | 111506287 A | 8/2020 |

OTHER PUBLICATIONS

Office Action of corresponding Chinese Application No. 202010269348.6, dated Jan. 20, 2023, 10 pages.
International Search Report for PCT/CN2020/133121 dated Apr. 8, 2020.
Notice of grant of patent right for invention of corresponding Chinese Application No. 202010269348.6, dated May 29, 2023, 11 pages.

* cited by examiner

PAGE DISPLAYING METHOD AND APPARATUS, ELECTRONIC DEVICE AND STORAGE MEDIUM

CROSS-REFERENCE TO RELATED APPLICATIONS

This application is a continuation of International Application No. PCT/CN2020/133121 filed on Dec. 1, 2020, which claims priority to Chinese Patent Application No. CN202010269348.6, filed with the CNIPA on Apr. 8, 2020, entitled "PAGE DISPLAYING METHOD AND APPARATUS, ELECTRONIC DEVICE AND STORAGE MEDIUM". The contents of the above identified applications are incorporated herein by reference in their entireties.

TECHNICAL FIELD

This application relates to the field of image processing technology, in particular to the field of computer vision technology, and specifically to a page displaying method and apparatus, an electronic device and a storage medium.

BACKGROUND

As Internet technology evolves, the display of pages has also diversified.

In the prior art, a page displaying method typically includes: extracting a theme color from an image of a page using a color quantization algorithm; determining HSBs corresponding to the theme color, where H stands for hue, S stands for saturation, and B stands for brightness; and presetting a range of HSBs to be filtered; comparing the determined HSBs with the range of HSBs to be filtered; filtering at least part of the HSBs within the range of HSB to be filtered; and displaying the page based on the remaining HSBs.

The inventor has devised this application from awareness of at least the following problems: filtering HSBs by setting a filtering range is not very flexible, and not very conducive to realize differentiated displaying of different pages.

SUMMARY

A page displaying method and apparatus, an electronic device and a storage medium are disclosed.

According to a first aspect, a page displaying method is provided, including:
extracting a theme color from an image of the page to be displayed;
determining a coloration attribute of the theme color, where the coloration attribute is a chromatic attribute, or the coloration attribute is a non-chromatic attribute; and
adjusting the page to be displayed according to the coloration attribute and displaying the page.

In the disclosed embodiment, various pages are adjusted and displayed based on different coloration attributes of the theme color, thus avoiding a disadvantage related to lack of flexibility caused by filtering the theme color by a preset filtering range in related art, realizing diversity and flexibility in displaying for various pages, avoiding the disadvantage of distortion of images caused by simple filtering, and improving the reliability and accuracy of page display.

According to a second aspect, a page displaying apparatus is provided, including:

an acquiring module, configured to extract a theme color from an image of the page to be displayed;
a first determining module, configured to determine a coloration attribute of the theme color, where the coloration attribute is a chromatic attribute, or the coloration attribute is a non-chromatic attribute;
an adjusting module, configured to adjust the page to be displayed according to the coloration attribute; and
a displaying module, configured to display the adjusted page to be displayed.

According to a third aspect, an electronic device is provided, including:
at least one processor; and
a memory, communicatively connected to the at least one processor, where:
the memory stores thereon instructions executable by the at least one processor, and the instructions are executed by the at least one processor to enable the at least one processor to execute the method according to any one of the foregoing embodiments.

According to a fourth aspect, a non-transitory computer-readable storage medium is provided, storing thereon computer instructions that are used to cause a computer to execute the method according to any one of the foregoing embodiments.

According to a fifth aspect, a page displaying method is provided, including:
determining, according to a theme color of an image of a page to be displayed, a coloration attribute corresponding to the theme color, where the coloration attribute is a chromatic attribute, or the coloration attribute is a non-chromatic attribute; and
adjusting the page to be displayed according to the coloration attribute and displaying the page.

According to a sixth aspect, an embodiment of this application further provides a computer program, including program codes which, when being run by a computer, execute the method according to any one of the foregoing embodiments.

The technology according to this application avoids a disadvantage related to lack of flexibility caused by filtering the theme color by a preset filtering range in related art, realizes diversity and flexibility in displaying for various pages, avoids the disadvantage of distortion of images caused by simple filtering, and improves the reliability and accuracy of page display.

It should be understood that what is described in this section is not intended to identify critical or important features of embodiments of this disclosure, nor is it intended to limit the scope of this disclosure. Other features of this disclosure will be readily understood by the following specification.

BRIEF DESCRIPTION OF THE DRAWINGS

The drawings are used to facilitate understanding of this solution, and do not constitute any limitation on this application. In the drawings.

DETAILED DESCRIPTION OF THE EMBODIMENTS

Now, exemplary embodiments of this application will be described with reference to the accompanying drawings, which include various details of the embodiments of this application to facilitate understanding, and shall be considered as merely exemplary. Therefore, those of ordinary skill in the art should appreciate that various changes and modifications can be made to the embodiments described herein without departing from the scope and spirit of this application. Also, for clarity and conciseness, descriptions of well-known functions and structures are omitted in the following description.

Figure 1:
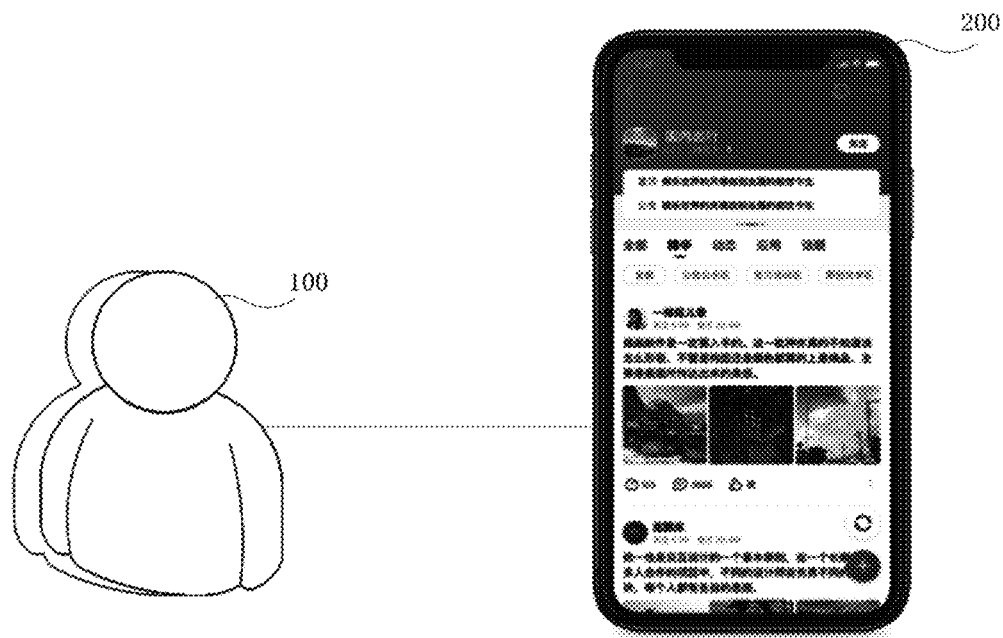
FIG. 1 is an application scenario of a page displaying method according to an embodiment of this application.

Reference is made to FIG. 1, which is an application scenario of a page displaying method according to an embodiment of this application.

In the application scenario as shown in FIG. 1, a user 100 may interact with a terminal device carrying a display apparatus, and in FIG. 1, the terminal device is specifically a mobile phone 200.

It should be noted that the mobile phone 200 shown in FIG. 1 is only for exemplary illustration of the terminal device, i.e., FIG. 1 only symbolically shows one of the terminal devices, and should not be construed as a limitation on the terminal device. For example, the terminal device may also include a computer, a laptop, an iPad, a smart bracelet, an in-vehicle terminal, and a smart robot, etc.

As shown in FIG. 1, the mobile phone 200 may display a page the user 100 is accessing by performing a page displaying method according to an embodiment this application.

In the related art, a page displaying method typically includes: extracting a theme color from an image of the page using a color quantization algorithm; determining HSBs corresponding to the theme color; comparing the determined HSBs with the range of HSBs to be filtered; filtering at least part of the HSBs within the range of HSB to be filtered; and displaying the page based on the remaining HSBs.

However, in the related art, the HSBs are filtered by simply setting the filtering range without considering the correlation between H, S and B when the page is displayed, leading to lack of flexibility, and difficulties in achieving differentiated display of different pages. Moreover, the simple divide-and-filter can cause potentially useful information to be discarded. Worse still, some information that may negatively affect the display might be retained. These will distort the page displayed.

After paying creative work, the inventor of this application has devised the inventive idea of this application: to tailor the display of different pages based on the association relationship between H, S and B.

Now, the technical solutions of this application and how the technical solutions thereof solve the above technical problems will be detailed with reference to specific embodiments. The following specific embodiments may be recombined with each other, and the same or similar concepts or processes may not be repeated in some embodiments. Now, embodiments of this application will be described with reference to the accompanying drawings.

Figure 2:
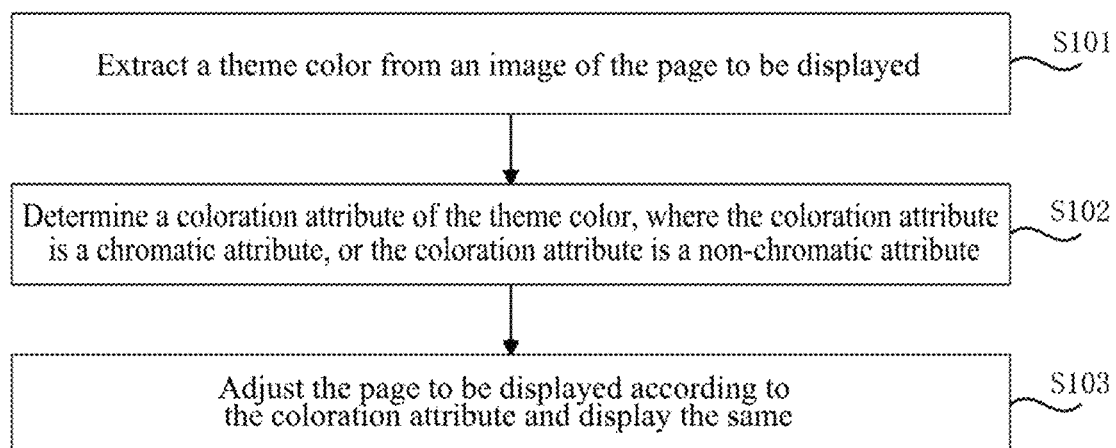
FIG. 2 is a flowchart illustrating a page displaying method according to an embodiment of this application.

Reference is made to FIG. 2, which is a flowchart illustrating a page displaying method according to an embodiment of this application.

As shown in FIG. 2, the method includes:

S101: extract a theme color from an image of the page to be displayed.

An executive entity for implementing the page displaying method of the embodiment of this application may be a page displaying apparatus, and the page displaying apparatus may be a terminal device, a server, etc.

The terminal device includes, but is not limited to, a mobile phone, a computer, a laptop computer, an iPad, a smart bracelet, a vehicle terminal and a smart robot. The server includes a local server, a cloud-based server.

For example, when the page displaying method of the embodiment of this application is applied to the application scenario as shown in FIG. 1, the executive entity for implementing the page displaying method may be a mobile phone as shown in FIG. 1.

Of course, in some other embodiments, the mobile phone can also communicate with a server, and when a user initiates a request to open a page, the server can execute the page displaying method of the embodiment of this application and control the mobile phone to display the page based on the corresponding display parameters.

Parameters of the theme color, which are used to represent the color of the image, can specifically include the hue H, saturation S and brightness B of the image. That is, by this step, the theme color HSB of the image can be determined.

In this step, the theme color HSB of the image of the page to be displayed can be extracted by means of a color quantization algorithm. A specific color quantization algorithm can be found in the prior art and will not be described herein.

S102: determine a coloration attribute of the theme color, where the coloration attribute is a chromatic attribute, or the coloration attribute is a non-chromatic attribute.

The coloration attribute represents the type of the color. In the embodiment of this application, the coloration attribute can be divided into two types according to whether the theme color is chromatic, one of which is chromatic attribute, i.e., the theme color is chromatic, and the other is non-chromatic attribute opposing the chromatic attribute, i.e., the subject hue is a color other than chromatic color, such as black.

S103: adjust the page to be displayed according to the coloration attribute and display the page.

In the embodiment of this application, after the coloration attribute of the theme color is determined, the page to be displayed can be adjusted based on the coloration attribute and be displayed after the adjustment.

Figure 3:
FIG. 3 a schematic diagram of a display effect of different pages according to this application.

In the embodiment of this application, the page displaying method of the embodiment of this application is separately applied to three pages to be displayed, each page being in a different theme color HSB, and the displayed effects of the three different pages can be referred to in FIG. 3.

Among them, the color displayed on the page corresponding to 3-1 in FIG. 3 is the first color, the color displayed on the page corresponding to 3-2 in FIG. 3 is the second color, and the color displayed on the page corresponding to 3-3 in FIG. 3 is the third color, and the first color, the second color and the third color are not the same.

In other words, the page displaying method of the embodiment of this application can diversify the pages to be displayed with different theme color HSBs, thus realizing flexibility and diversity in page display, and can meet the personalized needs of users.

In view of the above analysis, it can be seen that the embodiment of this application provides a page displaying method, including: extracting a theme color from an image of a page to be displayed and determining a coloration attribute corresponding to the theme color, where the coloration attribute is a chromatic attribute, or the coloration attribute is a non-chromatic attribute; and adjusting the page to be displayed according to the coloration attribute and displaying the page. In this embodiment, various pages are adjusted and displayed based on different coloration attributes of the theme color, thus avoiding a disadvantage related to lack of flexibility caused by filtering the theme color by a preset filtering range in related art, realizing diversity and flexibility in displaying for various pages, avoiding the disadvantage of distortion of images caused by simple filtering, and improving the reliability and accuracy of page display.

In view of the above example, it can be seen that in the embodiment of this application, the diversified display for different pages is mainly achieved by determining the coloration attribute of the theme color. Hence, in order to provide the reader with an in-depth understanding of the solution of the embodiment of this application, the solution of the embodiment of this application will now be described in more detail in conjunction with FIG. 4, in which a flowchart illustrating a page displaying method according to another embodiment of this application is shown.

Figure 4:
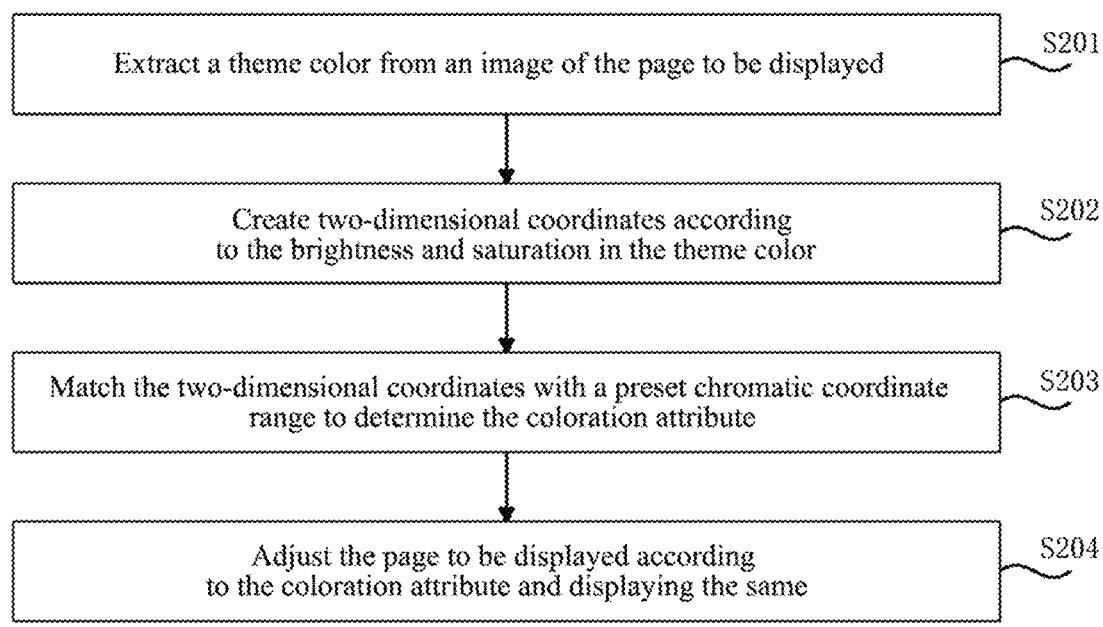
FIG. 4 is a flowchart illustrating a page displaying method according to another embodiment of this application.

As shown in FIG. 4, the method includes:

S201: extract a theme color from an image of the page to be displayed.

The description of S201 can be found in connection with S101, which will not be repeated herein.

S202: create two-dimensional coordinates according to the brightness and saturation in the theme color.

A three-dimensional color space can be created from the theme color HSBs, and the saturation S and the brightness B can be extracted therefrom to form the two-dimensional coordinates.

S203: match the two-dimensional coordinates with a preset chromatic coordinate range to determine the coloration attribute.

This step can be understood as determining whether the two-dimensional coordinates fall into the chromatic coordinate range, and determining the coloration attribute of the theme color HSB according to whether the two-dimensional coordinates indeed fall into the chromatic coordinate range.

For example, if the two-dimensional coordinates fall into the chromatic coordinate space, the coloration attribute of the theme color HSB is determined to be a chromatic attribute. If the two-dimensional coordinates do not fall into the chromatic coordinate space, the coloration attribute of the theme color HSB is determined to be a non-chromatic attribute.

In the embodiment of this application, the two-dimensional coordinates associating brightness with saturation are created to allow for combining the two-dimensional coordinates with the chromatic coordinate range to determine the coloration attribute of the theme color HSB. Since the attributes of the theme color HSB itself, i.e., the brightness and saturation, have been brought in view, and full consideration has been given to the correlation between the brightness and saturation, a more accurate coloration attribute of the theme color HSB can be obtained, so as to achieve diversity and flexibility in the subsequent displaying.

In some embodiments, the chromatic coordinate range can be determined as needed, empirically, by experiment, etc. In the embodiment of this application, a way to determine the chromatic coordinate range is provided. Specifically, a method for determining the chromatic coordinate range includes:

S01: construct a matrix according to a predetermined brightness range and a predetermined saturation range, the matrix being used to represent a positional relationship between the brightness range and the saturation range.

Typically, a value of the brightness B ranges from 0 to 100, i.e., the brightness range can be set to (0, 100). Similarly, a value of the saturation S ranges from 0 to 100, i.e., the saturation range can be set to (0, 100).

Therefore, a 100*100 matrix can be constructed according to the brightness range (0, 100) and the saturation range (0, 100), and the matrix can span from coordinates (0, 0) to coordinates (100, 100).

Figure 5:
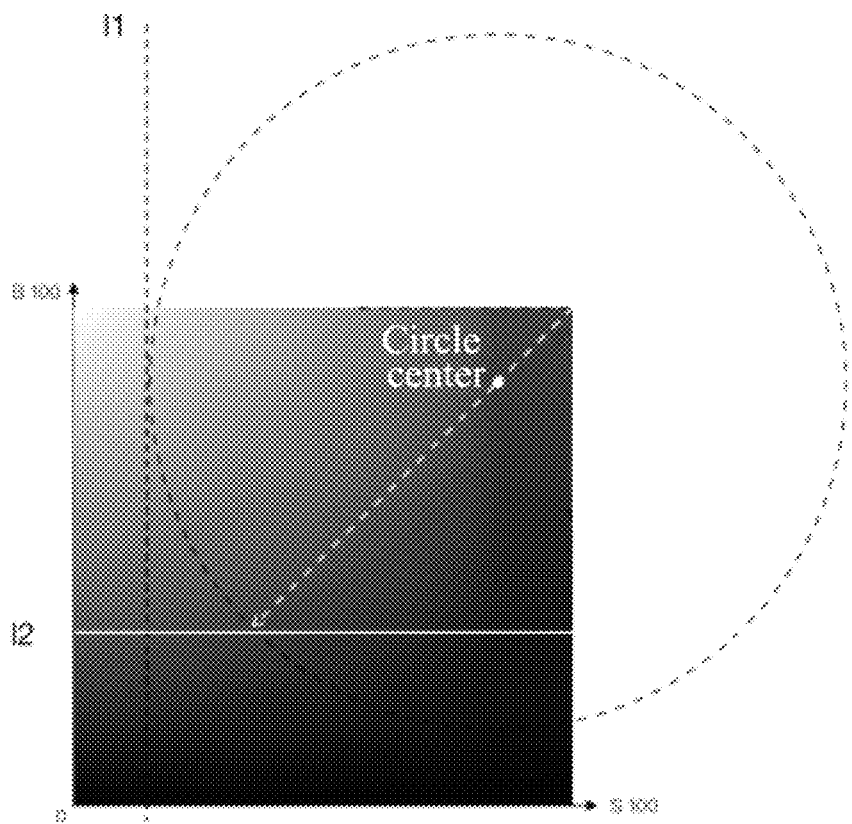
FIG. 5 is a schematic diagram of a chromatic coordinate range according to this application.

More details can be seen in FIG. 5, which shows a horizontal coordinate as the saturation S and a vertical coordinate as the brightness B.

S02: determine a color range according to the matrix and a predetermined circle center parameter.

In some embodiments, the circle center parameter includes a circle center scale factor and a radius, and S02 may specifically include:

S021: determine a diagonal of the matrix.

This step can be understood as determining the diagonal from coordinates (0, 0) to coordinates (100, 100). A function of the diagonal can be expressed by Eq. 1:

$$f(x)=x, 0 \leq x \leq 100, \text{ where } x \text{ is the horizontal coordinate.}$$

S022: determine the circle center on the diagonal according to the circle center scale factor.

For example, the circle center scale factor is α, and the circle center scale factor α is in the range of (0, 1). In some embodiments, α can be set to 0.8. Thus, the coordinates of the circle center are (100α, 100α), which can be seen in the "circle center point" marked in FIG. 5.

S022: determine a color range based on the circle center and the radius.

The radius can be in the range of (0, 100-100α), and in some embodiments, α can be set to 0.7.

After the circle center and the radius are determined, a circle can be determined. That is, the color range is the circle. A function of the circle can be expressed by Eq. 2:

$$(x-100\alpha)^2+(y-100\alpha)^2=r^2, \text{ where } y \text{ is the vertical coordinate, and } r \text{ is the radius.}$$

That is, coordinates (x, y) can be determined to fall into the color range when the coordinates (x, y) satisfy Eq. 3:

$$(x-100\alpha)^2+(y-100\alpha)^2<r^2, \text{ where } 0 \leq x, y \leq 100.$$

S023: determine a tangent line on the color range and closest to the origin of the matrix.

This step can be understood as drawing a tangent line l1 through the leftmost edge of the circle, which can be seen at the "l1" in FIG. 5. The l1 is parallel to the y-axis, and intersects with the x-axis at the coordinates (100−(100*(1−α)+r), 0), and a function of l1 can be expressed by Eq. 4:

$$x = 100 - (100*(1-\alpha) + r).$$

S024: determine a chromatic coordinate range according to the tangent line, the matrix, the color range and a preset white-gray division line.

The white-gray division line is parallel to the x-axis, and its value on the vertical axis is a preset δ. The white gray division line can be seen at the "l2" in FIG. 5.

In some embodiments, δ can be 33, then the function of the white-gray division line l2 can be expressed by Eq. 5:

$$y = \delta.$$

This step can be understood as determining the intersection of the tangent line l1, the white-gray division line l2, the matrix and the color range to be the chromatic coordinate range, i.e., the part defined by the tangent line l1, the white-gray division line l2, the matrix and the color range is determined to be the chromatic coordinate range.

In the embodiment of this application, by determining the intersection of the tangent line l1, the white-gray division line l2, the matrix and the color range to be the chromatic coordinate range, the reliability in the chromatic coordinate distinction can be achieved, so that the coloration attribute of the theme color HSB can be accurately determined when the attribute of the theme color HSB is examined.

Thus, at S203, it can be determined as to whether the theme color HSB is a chromatic attribute based on whether the two-dimensional coordinates fall into the chromatic coordinate range. If the chromatic coordinate distinction includes the two-dimensional coordinates, the theme color HSB is a chromatic attribute. If the chromatic coordinate range does not include the two-dimensional coordinates, the theme color HSB is a non-chromatic attribute.

Going on with the above example, if the two-dimensional coordinates are (x, y), the two-dimensional coordinates (x, y) are determined to be a chromatic attribute when one of Eq. 7 and Eq. 8 is satisfied, and Eq. 6 is also satisfied, where Eq. 6 is:

$$(x-100\alpha)^2 + (y-100\alpha)^2 = r^2;\text{ Eq. 7 is:}$$

$$x < 100 - (100*(1-\alpha) + r),\text{ and }\delta < y < 100\alpha;\text{ and Eq. 8 is:}$$

$$y = 100\alpha.$$

Figure 6:
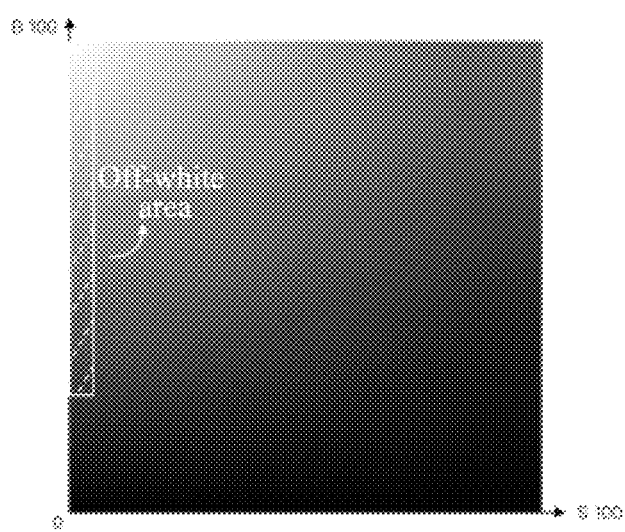
FIG. 6 is a schematic diagram of an off-white area according to this application.

See the "Off-white area" identified in FIG. 6.

Alternatively, if the two-dimensional coordinates are (x, y), the two-dimensional coordinates (x, y) are determined to be a non-chromatic attribute when one of Eq. 9 and Eq. 10 is satisfied, and Eq. 6 is also satisfied, where Eq. 9 is:

$$x < 100 - (100*(1-\alpha) + r),\text{ and }y < \delta;\text{ and Eq. 10 is:}$$

$$x > 100 - (100*(1-\alpha) + r),\text{ and }y < 100\alpha.$$

Figure 7:
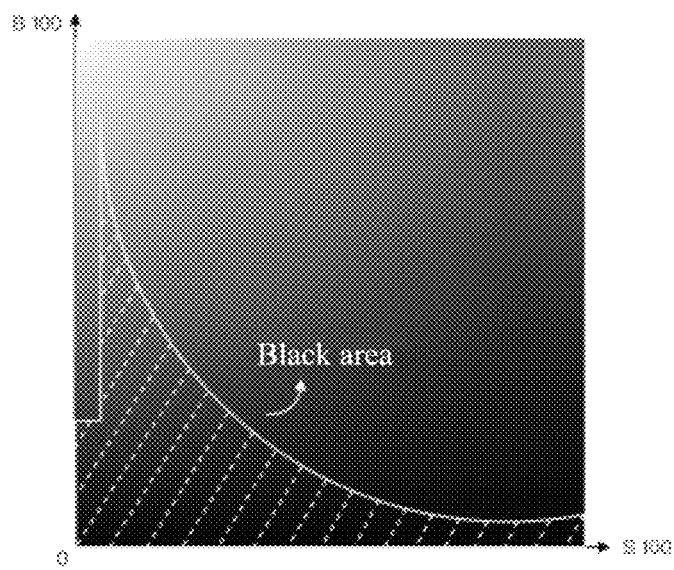
FIG. 7 is a schematic diagram of a black area according to this application.

See the "Black area" identified in FIG. 7.

Otherwise, the theme color HSB is a chromatic attribute.

S204: adjust the page to be displayed according to the coloration attribute and display the page.

The description of S204 can be found in connection with S103, which will not be repeated herein.

In order to provide the reader with a deeper understanding of the method for adjusting the page to be displayed of the embodiment of this application, the page displaying method of the embodiment of this application will now be described in more detail in conjunction with FIG. 8, in which a flowchart illustrating a page displaying method according to another embodiment of this application is shown.

Figure 8:
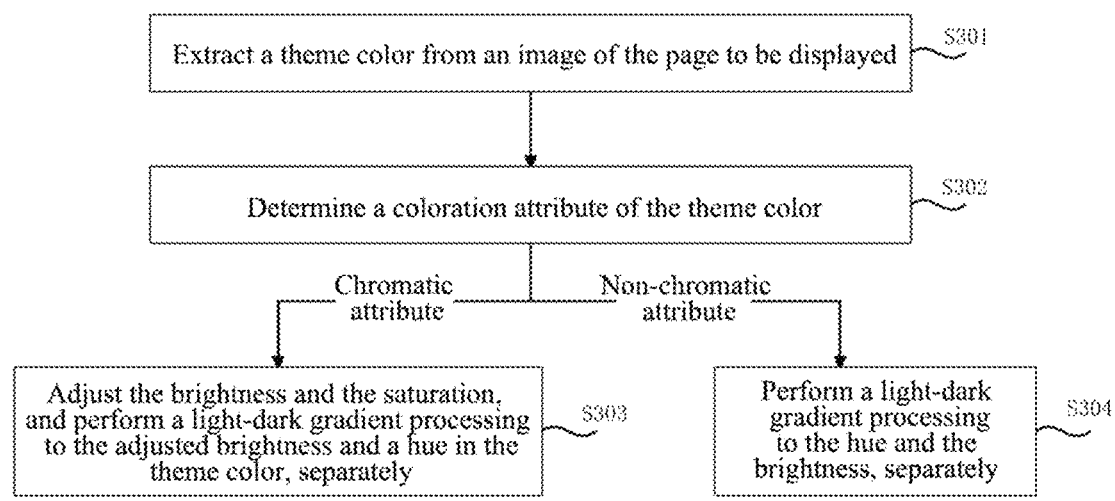
FIG. 8 is a flowchart illustrating a page displaying method according to yet another embodiment of this application.

As shown in FIG. 8, the method includes:

S301: extract a theme color from an image of the page to be displayed.

The description of S301 can be found in connection with S101, which will not be repeated herein.

S302: determine a coloration attribute of the theme color, where the coloration attribute is a chromatic attribute, or the coloration attribute is a non-chromatic attribute.

The description of S302 can be found in connection with S102, or S202 and S203, which will not be repeated herein.

Specifically, if the theme color HSB is a chromatic attribute, S303 is executed; if the theme color HSB is a non-chromatic attribute, S304 is executed.

S303: adjust the brightness and the saturation, and perform a light-dark gradient processing to the adjusted brightness and a hue in the theme color, separately.

That is, if the theme color HSB is a chromatic attribute, the brightness B and saturation S are adjusted first, and then the light-dark gradient processing is performed to the hue H and the adjusted brightness B, separately.

In some embodiments, the step of adjusting the brightness B includes:

S11: determine a hue range corresponding to the hue according to a predetermined mapping relationship between the hue and a color scheme range, where the hue range is proportional to a brightness modifier in the predetermined mapping relationship between the hue range and the brightness modifier.

It is worth noting that a same hue H gives different visual brightness sensations to different users. The hue H can be evenly divided into 24 color scheme ranges for every 15 degrees. The hue H is set as a brightness level every 15 degrees, with the same value range as the brightness B, i.e., 0-100. Then, the hue H and the brightness levels are shown in Table 1:

TABLE 1

| Hue H | 0 | 15 | 30 | 45 | ... | ... | 300 | 315 | 330 | 345 |
|---|---|---|---|---|---|---|---|---|---|---|
| Brightness level | $N_1$ | $N_2$ | $N_3$ | $N_4$ | ... | ... | $N_{21}$ | $N_{22}$ | $N_{23}$ | $N_{24}$ |

Figure 9:
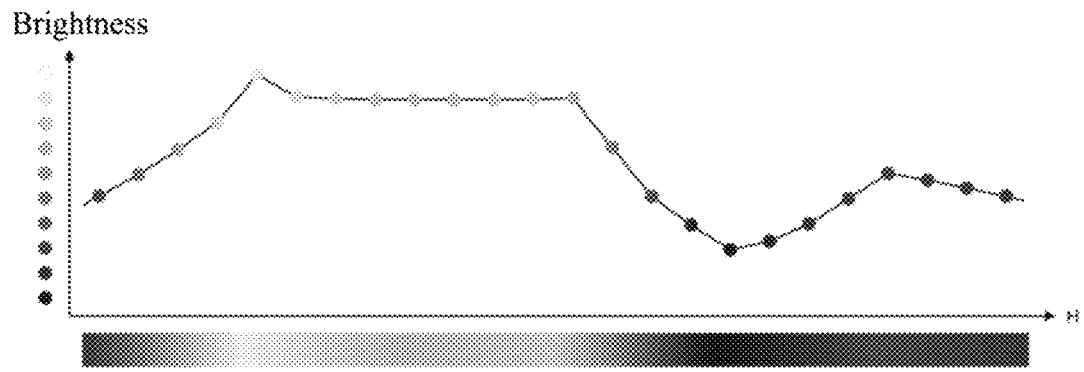
FIG. 9 is a schematic diagram of a luminosity curve according to this application.

A luminosity curve corresponding to Table 1 can be seen in FIG. 9.

In this step, the hue range corresponding to the hue H can be determined according to the hue H.

S12: determine a brightness modifier corresponding to the hue range according to a predetermined mapping relationship between the hue range and the brightness modifier.

As can be known based on the luminosity curve shown in FIG. 9, higher brightness B requires larger magnitude of adjustment, so the adjustment curve of brightness B can be derived from the luminosity curve.

Figure 10:
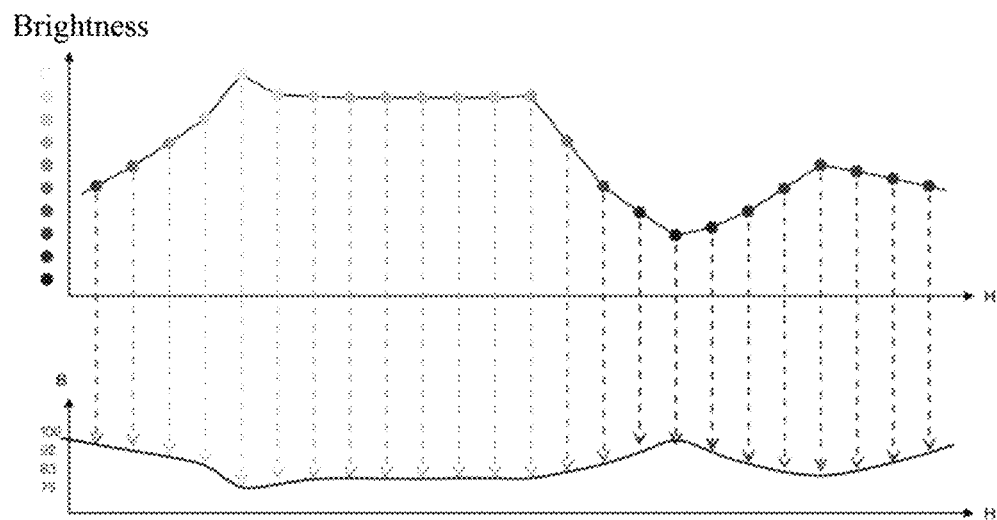
FIG. 10 is a schematic diagram of a mapping between hue and brightness according to this application.

If the value range of brightness B is [$N_{min}$, $N_{max}$], that is, when the maximum value of brightness level is $N_{max}$, and the minimum value is $N_{min}$, the corresponding mapping relationship between the luminosity curve and the adjustment curve of brightness B can be expressed by Eq. 11:

$$\alpha_i = N_{max} - \frac{\alpha_{max} - \alpha_{min}}{N_{max} - N_{min}} \times N_i.$$

where $\alpha_i$ corresponds to the adjustment to the brightness B when hue H is i, and the schematic diagram of the mapping can be seen in FIG. 10.

In other words, a list of modifiers of brightness B for the 24 color scheme ranges can be determined, as can be seen in Table 2.

TABLE 2

| Hue H | 0 | 15 | 30 | 45 | ... | ... | 300 | 315 | 330 | 345 |
|---|---|---|---|---|---|---|---|---|---|---|
| Brightness modifier | $\alpha_1$ | $\alpha_2$ | $\alpha_3$ | $\alpha_4$ | ... | ... | $\alpha_{21}$ | $\alpha_{22}$ | $\alpha_{23}$ | $\alpha_{24}$ |

In this step, the corresponding brightness modifier can be determined according to the hue range and the brightness range.

S13: determine an adjusted brightness according to the hue, the hue range and the brightness modifier corresponding to the hue range.

For example, in this step, if the hue range of the hue H is $[H_1, H_2]$ and, the hue H specifically equals to $H_i$, the brightness modifier is $\alpha_1$, then the adjusted brightness can be determined by Eq. 12:

$$B = \left(1 + \frac{H_i - H_1}{H_2 - H_1}\right) \times \alpha_1.$$

In the embodiment of this application, the correlation between the hue H and the brightness B is fully considered, so that the adjusted brightness fully reflects the characteristics of the theme color HSB, thus making the page display meet the need for flexibility while also being able to conform to the characteristics of the image.

S14: adjust the brightness according to the adjusted brightness.

This step can be understood as adjusting the brightness B to the adjusted brightness calculated in S13. The specific method of adjustment can be found in the prior art and will not be repeated herein.

In some embodiments, the step of adjusting the saturation S includes:

S21: determine an adjustment range corresponding to the saturation according to a predetermined mapping relationship between the saturation and the adjustment range, where the saturation is proportional to the adjustment range in the predetermined mapping relationship between the saturation and the adjustment range.

The mapping relationship between the saturation S and the adjustment range can be determined as needed, empirically or by experiment.

S22: determine an adjusted saturation according to the saturation and the adjustment range.

For example, when the adjustment range is $[S_{min}, S_{max}]$: if the saturation S is less than or equal to $S_{min}$, then the adjusted saturation is $S_{min}$; if the saturation S is greater than $S_{min}$ and less than $S_{max}$, then no adjustment to the saturation S is needed; if the saturation S is greater than or equal to $S_{max}$, then the adjusted saturation S is $S_{max}$.

In the embodiment of this application, since the mapping relationship between the saturation and the adjustment range is preset, the corresponding saturation S can be adjusted based on the adjustment range, thus allowing for improved efficiency in the adjustment of the saturation S, as well as achieving reliability in the adjustment of the saturation S.

S23: adjust the saturation according to the adjusted saturation.

In some embodiments, the performing a light-dark gradient processing to the hue includes:

S31: determine a magnitude relationship between the hue and a predetermined hue split value.

For example, five hue split values can be set, which are $H_1, H_2, H_3, H_4, H_5$. The magnitude relationship between the hue H and the five hue split values can be determined by means of magnitude comparison.

S32: determine an adjusted hue according to the hue, the magnitude relationship and a predetermined hue adjustment factor.

For example, if the hue H is less than or equal to $H_1$, then the adjusted hue equals to the sum of the hue H and the hue adjustment factor; if the hue H is greater than $H_1$ and less than or equal to $H_2$, then the adjusted hue equals to the difference between the hue H and the hue adjustment factor; if the hue H is greater than $H_2$ and less than or equal to $H_3$, then the adjusted hue equals to the sum of the hue H and the hue adjustment factor; if the hue H is greater than $H_3$ and less than or equal to $H_4$, then the adjusted hue equals to the difference between the hue H and the hue adjustment factor; if the hue H is greater than $H_4$ and less than or equal to $H_5$, then the adjusted hue equals to the sum of the hue H and the hue adjustment factor; if the hue H is greater than $H_5$, then the adjusted hue equals to the difference between the hue H and the hue adjustment factor.

In the embodiment of this application, presetting the hue split values enables the adjusted range to be quickly determined, so that the hue H can be quickly adjusted using the corresponding hue adjustment factor, thus improving the smoothness in the page displaying.

S33: adjust the hue according to the adjusted hue.

In some embodiments, the performing a light-dark gradient processing to the brightness includes:

S41: determine a target brightness according to the brightness and a predetermined brightness adjustment factor.

The brightness adjustment factor may be set as needed, empirically or by experiment.

For example, the target brightness equals to a sum of the brightness B and the brightness adjustment factor.

S42: adjust the brightness according to the target brightness.

It is worth noting that, for the performing a light-dark gradient processing to the adjusted brightness, reference can be made to the above steps, which will not be repeated herein.

S304: perform a light-dark gradient processing to the hue and the brightness, separately.

For performing the light-dark gradient processing to the hue, reference can be made to the description of S303, and the principle of performing the light-dark gradient processing to the brightness is the same as that of performing the light-dark gradient processing to the adjusted brightness in S303. Hence, the more details about S304 can be referred to S303, which will not be repeated herein.

According to another aspect of embodiments of this application, an embodiment of this application also provides a page displaying apparatus corresponding to the above methods.

Figure 11:
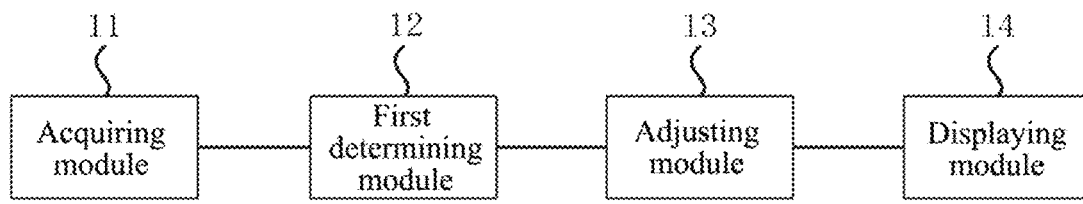
FIG. 11 is a schematic diagram of a page displaying apparatus according to an embodiment of this application.

Reference is made to FIG. 11, which is a schematic diagram of a page displaying apparatus according to an embodiment of this application.

As shown in FIG. 11, the device includes:

an acquiring module 11, configured to extract a theme color from an image of the page to be displayed;

a first determining module 12, configured to determine a coloration attribute of the theme color, where the coloration attribute is a chromatic attribute, or the coloration attribute is a non-chromatic attribute;

an adjusting module 13, configured to adjust the page to be displayed according to the coloration attribute; and a displaying module 14, configured to display the adjusted page to be displayed.

Figure 12:
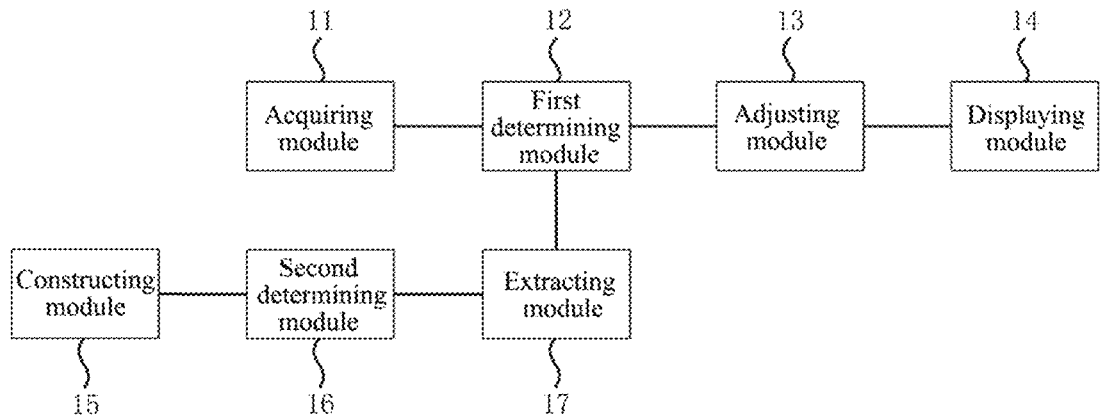
FIG. 12 is a schematic diagram of a page displaying apparatus according to another embodiment of this application.

In conjunction with FIG. 12, it can be seen that in some other embodiments the apparatus further includes:

a constructing module 15, configured to construct a matrix according to a predetermined brightness range and a predetermined saturation range, the matrix being used to represent a positional relationship between the brightness range and the saturation range;

a second determining module 16, configured to determine a color range according to the matrix and a predetermined circle center parameter; and an extracting module 17, configured to extract a chromatic coordinate range from the color range according to the matrix and a predetermined white-gray division line, where the first determining module is configured to determine the coloration attribute according to the chromatic coordinate range, and a brightness and a saturation in the theme color.

In some embodiments, the adjusting module 13 is configured to: in response to the coloration attribute being the chromatic attribute, adjust the brightness and the saturation in the theme color, and perform a light-dark gradient processing to the adjusted brightness and a hue in the theme color, separately; or in response to the coloration attribute being the non-chromatic attribute, perform a light-dark gradient processing to the hue and the brightness, separately.

In some embodiments, the adjusting module 13 is configured to: determine a hue range corresponding to the hue according to a predetermined mapping relationship between hue and color scheme range; determine a brightness modifier corresponding to the hue range according to a predetermined mapping relationship between the hue range and the brightness modifier; determine an adjusted brightness based on the hue, the hue range and the brightness modifier corresponding to the hue range; and adjust the brightness according to the adjusted brightness.

The hue range is proportional to the brightness modifier in the predetermined mapping relationship between the hue range and the brightness modifier.

In some embodiments, the adjusting module 13 is configured to: determine an adjustment range corresponding to the saturation according to a predetermined mapping relationship between the saturation and the adjustment range; determine an adjusted saturation according to the saturation and the adjustment range; and adjust the saturation according to the adjusted saturation.

The saturation is proportional to the adjustment range in the predetermined mapping relationship between the saturation and the adjustment range.

In some embodiments, the adjusting module 13 is configured to: determine a magnitude relationship between the hue and a predetermined hue split value; determine an adjusted hue according to the hue, the magnitude relationship and a predetermined hue adjustment factor; and adjust the hue according to the adjusted hue.

In some embodiments, the adjusting module 13 is configured to: determine a target brightness according to the brightness and a predetermined brightness adjustment factor; and adjust the brightness according to the target brightness.

According to an embodiment of the present application, an electronic device and a readable storage medium are also provided.

Figure 13:
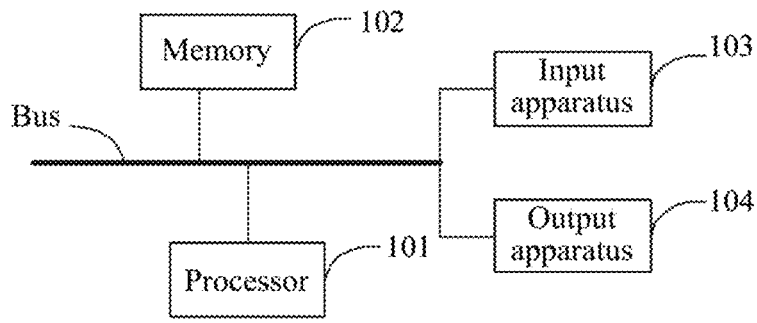
FIG. 13 is a block diagram of an electronic device according to an embodiment of this application.

FIG. 13 is a block diagram of an electronic device according to an embodiment of this application. The electronic device is intended to represent a digital computer in various forms, such as a laptop computer, a desktop computer, a workstation, a personal digital assistant, a server, a blade server, a mainframe, and other appropriate computers. The electronic device may also represent a mobile device in various forms, such as a personal digital processing, a cellular phone, a smart phone, a wearable device, and other similar computing devices. The components, their connections and relationships, and their functions as illustrated herein are merely examples, and are not intended to limit the implementation of embodiments of this application described and/or required herein.

As shown in FIG. 13, the electronic device includes: one or more processors 101, a memory 102, and interfaces for connecting various components, including a high-speed interface and a low-speed interface. The various components are interconnected via different buses and can be mounted on a common motherboard or otherwise installed as required. The processors can process instructions executed within the electronic device, including instructions stored in or on the memory for displaying graphical information of the GUI on an external input/output apparatus, such as a display apparatus coupled to the interface. In other embodiments, multiple processors and/or buses can be used with multiple memories and multiple memories, if desired. Similarly, multiple electronic devices can be joined together, e.g., as a server array, a group of blade servers or a multiprocessor system, with each device providing some of the necessary operations. One processor 101 is illustrated as an example in FIG. 13.

The memory 102 is a non-transitory computer-readable storage medium provided by an embodiment of this application. The memory stores instructions executable by the at least one processor to enable the least one processor to implement the page displaying method provided in an embodiment of this application. The non-transitory computer-readable storage medium of the embodiment of this application stores thereon computer instructions which are used to cause a computer to implement the page displaying method provided in the embodiments of this application.

The memory 102 is a non-transitory computer-readable storage medium which can be used to store non-transitory software programs, non-transitory computer executable programs and modules, such as program instructions/modules corresponding to the embodiments of this application. The processor 101 runs the non-transitory software programs, instructions and modules stored in the memory 102 to execute various functional applications and data processing for the server, i.e., implementing the page displaying method in the foregoing method embodiments.

The memory 102 may include a program storage partition and a data storage partition, where the program storage partition may store an operating system and an application program required for at least one function, and the data storage partition may store data created for use by the electronic device. In addition, the memory 102 may include a high-speed random access memory, and may also include a non-transitory memory, such as at least one magnetic disk storage device, a flash memory device, or other non-transitory solid-state storage device. In some embodiments, the memory 102 may optionally include a memory remotely disposed with respect to the processor 101, and the remote memory may be connected through a network to the electronic device. Examples of the above network include, but are not limited to, the Internet, an Intranet, a local area network, a block-chain-based service networks (BSN), a mobile communication network and combinations thereof.

The electronic device may further include an input apparatus 103 and an output apparatus 104. The processor 101, the memory 102, the input apparatus 103, and the output apparatus 104 may be connected via a bus or other means. FIG. 13 has illustrated a connection via a bus as an example.

The input apparatus 103 can receive inputted numeric or character information, and generate a key signal input related to a user setting and function control of an electronic device, such as a touch screen, a keypad, a mouse, a trackpad, a touchpad, a pointing stick, one or more mouse buttons, a trackball, a joystick or the like. The output apparatus 104 may include a display apparatus, an auxiliary lighting apparatus (e.g., an LED), a haptic feedback apparatus (e.g., a vibration motor) and the like. The display apparatus may include, but is not limited to, a liquid crystal display (LCD), a light emitting diode (LED) display, and a plasma display. In some embodiments, the display apparatus may be a touch screen.

Various implementations of the systems and technologies described herein may be implemented in a digital electronic circuitry, an integrated circuit system, an application-specific integrated circuit (ASIC), computer hardware, firmware, software, and/or combinations thereof. These various embodiments may include: implementations in one or more computer programs, which are executable by and/or interpreted on a programmable system including at least one programmable processor, the programmable processor may be application specific or general-purpose and can receive data and instructions from a storage system, at least one input apparatus and/or at least one output apparatus, and can transmit data and instructions to the storage system, the at least one input apparatus, and the at least one output apparatus.

These computing programs (also known as programs, software, software applications or codes) include machine instructions of a programmable processor, and can be implemented using high-level procedures and/or object-oriented programming languages, and/or assembly/machine languages. As used herein, the terms "machine-readable medium" and "computer-readable medium" both refer to any computer program product, apparatus, and/or apparatus (e.g., a magnetic disk, an optical disk, a memory, a programmable logic device (PLD) used to provide the machine instructions and/or data to a programmable processor, including machine-readable media that receive machine instructions as machine-readable signals. The term "machine-readable signal" refers to any signal used to provide machine instructions and/or data to a programmable processor.

To provide interaction with a user, the systems and technologies described herein can be implemented on a computer that has: a display apparatus (e.g., a cathode ray tube (CRT) or liquid crystal display (LCD) monitor) for displaying information to the user; and a keyboard and a pointing apparatus (e.g., a mouse or a trackball) through which the user can provide input to the computer. Other kinds of devices may also be used to provide interaction with the user. For example, the feedback provided to the user may be any form of sensory feedback (e.g., a visual feedback, an auditory feedback, or a haptic feedback), and input from the user may be received in any form (including an acoustic input, a voice input, or a haptic input).

The systems and technologies described herein can be implemented in a computing system that includes a back-end component (e.g., as a data server), or a middleware components (e.g., an application server), or a front-end component (e.g., a user computer with a graphical user interface or web browser through which the user can interact with the implementation of the systems and technologies described herein), or any combination of such back-end component, middleware component or front-end component. Various components of the system may be interconnected by digital data communication in any form or via medium (e.g., a communication network). Examples of the communication network include: local area networks (LANs), block-chain-based service networks (BSNs), wide area networks (WANs), and the Internet.

The computer system may include a client and a server. The client and server are typically remote from each other and interact via a communication network. The client-server relationship is created by computer programs running on respective computers having a client-server relationship with each other.

According to another aspect of embodiments of this application, an embodiment of this application also provides a page displaying aspect.

Figure 14:
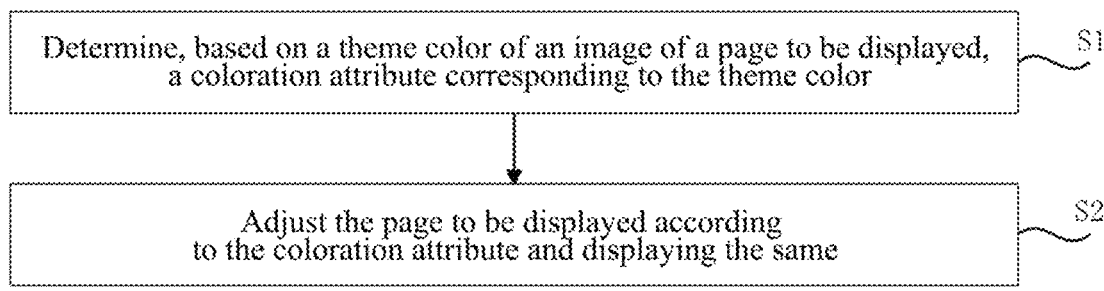
FIG. 14 is a flowchart illustrating a page displaying method according to another embodiment of this application.

Referring to FIG. 14, which is a flowchart illustrating a page displaying method according to another embodiment of this application.

As shown in FIG. 14, the method includes:

S1: determine, according to a theme color of an image of a page to be displayed, a coloration attribute corresponding to the theme color, where the coloration attribute is a chromatic attribute, or the coloration attribute is a non-chromatic attribute.

S2: adjust the page to be displayed according to the coloration attribute and displaying the page.

In the embodiment of this application, the coloration attribute of the theme color can be determined to be a chromatic attribute, or a non-chromatic attribute, in order to implement an adjustment policy corresponding to the coloration attribute. For example, when the coloration attribute of the theme color is the chromatic attribute, the brightness and saturation of the HSB of the theme color can be adjusted first, and a light-dark gradient processing is performed to the hue and the adjusted brightness. When the coloration attribute of the theme color is a non-chromatic attribute, a light-dark gradient processing is performed to the brightness and hue directly, so as to realize the diversity in the displaying.

According to another aspect of embodiments of this application, an embodiment of this application also provides a computer program, including program codes which, when being run by a computer, execute the method according to any one of the foregoing embodiments.

It should be understood that steps may be reordered, add or removed by using the various forms of processes shown above. For example, various steps described in this application may be executed in parallel, in sequence, or in alternative orders. As long as the desired results of the technical solutions disclosed in this application can be achieved, no limitation is imposed herein.

What is claimed is:

1. A page displaying method, comprising:
extracting a theme color from an image of the page to be displayed by a color quantization algorithm;

determining a coloration attribute of the theme color, wherein the coloration attribute is a chromatic attribute, or the coloration attribute is a non-chromatic attribute; and adjusting the page to be displayed according to the coloration attribute and displaying the page;

wherein the method further comprises:

constructing a matrix according to a predetermined brightness range and a predetermined saturation range, the matrix being used to represent a positional relationship between the brightness range and the saturation range, wherein the matrix spans from coordinates (0, 0) to coordinates (100, 100), and a horizontal coordinate represents a saturation and a vertical coordinate represents a brightness;

determining a color range according to the matrix and a predetermined circle center parameter, wherein the color range is a circle whose circle center is on a diagonal of the matrix, and coordinates of the circle center of the color range and a radius of the color range are determined based on the predetermined circle center parameter; and extracting a chromatic coordinate range from the color range according to the matrix and a predetermined white-gray division line, wherein the white-gray division line is parallel to a horizontal axis, and a value of the white-gray division line on a vertical axis is preset;

wherein the determining a coloration attribute of the theme color comprises:
creating two-dimensional coordinates according to a brightness and a saturation in the theme color; and
if the two-dimensional coordinates fall into the chromatic coordinate range, determining, the coloration attribute of the theme color to be the chromatic attribute; and
if the two-dimensional coordinates do not fall into the chromatic coordinate range, determining, the coloration attribute of the theme color to be the non-chromatic attribute;

wherein the adjusting the page to be displayed according to the coloration attribute comprises:
in response to the coloration attribute being the chromatic attribute, adjusting the brightness and the saturation in the theme color, and performing a light-dark gradient processing to the adjusted brightness and a hue in the theme color, separately;
in response to the coloration attribute being the non-chromatic attribute, performing a light-dark gradient processing to the hue and the brightness, separately;

wherein the adjusting the brightness comprises:
determining a hue range corresponding to the hue according to a predetermined mapping relationship between the hue and a color scheme range;
determining a brightness modifier corresponding to the hue range according to a predetermined mapping relationship between the hue range and the brightness modifier;
determining an adjusted brightness according to the hue, the hue range and the brightness modifier corresponding to the hue range; and
adjusting the brightness according to the adjusted brightness;

wherein the adjusting the saturation comprises:
determining an adjustment range corresponding to the saturation according to a predetermined mapping relationship between the saturation and the adjustment range;
determining an adjusted saturation according to the saturation and the adjustment range; and
adjusting the saturation according to the adjusted saturation;

wherein the performing a light-dark gradient processing to the hue comprises:
determining a magnitude relationship between the hue and a predetermined hue split value;
determining an adjusted hue according to the hue, the magnitude relationship and a predetermined hue adjustment factor; and
adjusting the hue according to the adjusted hue;

wherein the performing a light-dark gradient processing to the brightness comprises:
determining a target brightness according to the brightness and a predetermined brightness adjustment factor; and
adjusting the brightness according to the target brightness.

2. The method according to claim 1, wherein the hue range is proportional to the brightness modifier in the predetermined mapping relationship between the hue range and the brightness modifier.

3. The method according to claim 1, wherein the saturation is proportional to the adjustment range in the predetermined mapping relationship between the saturation and the adjustment range.

4. An electronic device, comprising:
at least one processor; and
a memory, communicatively connected to the at least one processor, wherein:
the memory stores thereon instructions that are executable by the at least one processor to enable the at least one processor to:
extract a theme color from an image of the page to be displayed by a color quantization algorithm;
determine a coloration attribute of the theme color, wherein the coloration attribute is a chromatic attribute, or the coloration attribute is a non-chromatic attribute; and
adjust the page to be displayed according to the coloration attribute and displaying the page;
wherein the at least one processor is further enabled to:
construct a matrix according to a predetermined brightness range and a predetermined saturation range, the matrix being used to represent a positional relationship between the brightness range and the saturation range, wherein the matrix spans from coordinates (0, 0) to coordinates (100, 100), and a horizontal coordinate represents a saturation and a vertical coordinate represents a brightness;
determine a color range according to the matrix and a predetermined circle center parameter, wherein the color range is a circle whose circle center is on a diagonal of the matrix, and coordinates of the circle center of the color range and a radius of the color range are determined based on the predetermined circle center parameter;
extract a chromatic coordinate range from the color range according to the matrix and a predetermined white-gray division line, wherein the white-gray division line is parallel to a horizontal axis, and a value of the white-gray division line on a vertical axis is preset;
create two-dimensional coordinates according to a brightness and a saturation in the theme color:
if the two-dimensional coordinates fall into the chromatic coordinate range, determine the coloration attribute of the theme color to be the chromatic attribute; and if the two-dimensional coordinates do not fall into the chromatic coordinate range, determine the coloration attribute of the theme color to be the non-chromatic attribute;

in response to the coloration attribute being the chromatic attribute, adjust the brightness and the saturation in the theme color, and perform a light-dark gradient processing to the adjusted brightness and a hue in the theme color, separately;

in response to the coloration attribute being the non-chromatic attribute, perform a light-dark gradient processing to the hue and the brightness, separately;

determine a hue range corresponding to the hue according to a predetermined mapping relationship between the hue and a color scheme range;

determine a brightness modifier corresponding to the hue range according to a predetermined mapping relationship between the hue range and the brightness modifier;

determine an adjusted brightness according to the hue, the hue range and the brightness modifier corresponding to the hue range;

adjust the brightness according to the adjusted brightness;

determine a magnitude relationship between the hue and a predetermined hue split value;

determine an adjusted hue according to the hue, the magnitude relationship and a predetermined hue adjustment factor;

adjust the hue according to the adjusted hue;

determine a target brightness according to the brightness and a predetermined brightness adjustment factor; and adjust the brightness according to the target brightness.

5. The electronic device according to claim 4, wherein the hue range is proportional to the brightness modifier in the predetermined mapping relationship between the hue range and the brightness modifier.

6. The electronic device according to claim 4, wherein the saturation is proportional to the adjustment range in the predetermined mapping relationship between the saturation and the adjustment range.

7. A non-transitory computer readable storage medium, storing thereon computer instructions that are used to enable a computer to implement the method according to claim 1.

* * * * *